(12) United States Patent
Tsai et al.

(10) Patent No.: US 11,342,818 B2
(45) Date of Patent: May 24, 2022

(54) ENCODER, MOTOR AND CONTROLLING METHOD OF ENCODER

(71) Applicant: DELTA ELECTRONICS, INC., Taoyuan (TW)

(72) Inventors: Ching-Hsiung Tsai, Taoyuan (TW); Chieh-Huang Lu, Taoyuan (TW); Jeng-Ping Lin, Taoyuan (TW); Hui-Chun Chu, Taoyuan (TW); Min-Ling Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 45 days.

(21) Appl. No.: 17/102,389

(22) Filed: Nov. 23, 2020

(65) Prior Publication Data

US 2021/0194331 A1   Jun. 24, 2021

Related U.S. Application Data

(60) Provisional application No. 62/952,492, filed on Dec. 23, 2019.

(30) Foreign Application Priority Data

Sep. 21, 2020   (CN) .......................... 202010994720.X

(51) Int. Cl.
| | | |
|---|---|---|
| *G01B 7/30* | (2006.01) | |
| *H02K 11/33* | (2016.01) | |
| *H02P 6/16* | (2016.01) | |
| *G01D 5/249* | (2006.01) | |

(52) U.S. Cl.
CPC ............ *H02K 11/33* (2016.01); *G01D 5/2497* (2013.01); *H02P 6/16* (2013.01)

(58) Field of Classification Search
CPC ........ H02K 11/33; G01D 5/2497; H02P 6/16; G01B 7/30
See application file for complete search history.

(56) References Cited

U.S. PATENT DOCUMENTS

| | | | |
|---|---|---|---|
| 2004/0222764 A1 | 11/2004 | Miura et al. | |
| 2017/0211950 A1* | 7/2017 | Tanabe | ..................... H02J 9/061 |
| 2019/0109549 A1 | 4/2019 | Odagiri et al. | |

FOREIGN PATENT DOCUMENTS

| | | |
|---|---|---|
| CN | 101583852 A | 11/2009 |
| CN | 102506907 A | 6/2012 |
| CN | 103940457 A | 7/2014 |
| CN | 107655510 A | 2/2018 |
| CN | 109428435 A | 3/2019 |
| CN | 208723751 U | 4/2019 |

(Continued)

*Primary Examiner* — Cortez M Cook
(74) *Attorney, Agent, or Firm* — CKC & Partners Co., LLC

(57) ABSTRACT

A controlling method of an encoder includes: detecting a rotation angle of a rotor of a motor coupled to the encoder to generate a first counting trigger signal and a second counting trigger signal so as to perform a turn number counting procedure; determining whether a period that an operating voltage of a driving circuit of the motor is smaller than a threshold voltage exceeds a preset time; and when the period exceeds the preset time, controlling a switching unit of the encoder to allow a battery of the encoder to provide a backup voltage to the encoder such that the encoder enters a low power processing procedure.

20 Claims, 6 Drawing Sheets

(56) References Cited

FOREIGN PATENT DOCUMENTS

| | | | |
|---|---|---|---|
| JP | H09-233795 | A | 9/1997 |
| JP | 2005-065471 | A | 3/2005 |
| JP | 2007-192785 | A | 8/2007 |
| JP | 2009079925 | A * | 4/2009 |
| JP | 6196532 | B2 | 9/2017 |
| TW | 200944762 | A | 11/2009 |
| TW | M545245 | U | 7/2017 |
| WO | 2019/159311 | A1 | 8/2019 |

* cited by examiner

ENCODER, MOTOR AND CONTROLLING METHOD OF ENCODER

RELATED APPLICATIONS

This application claims priority to U.S. Provisional Application Ser. No. 62/952,492, filed Dec. 23, 2019, and China Application Serial Number 202010994720.X, filed Sep. 21, 2020, the disclosures of which are incorporated herein by reference in their entireties.

BACKGROUND

Field of Invention

The present invention relates to an encoder and a controlling method of the encoder. More particularly, the present invention relates to an encoder of a motor and a controlling method of the encoder of the motor.

Description of Related Art

An AC servomotor contains an encoder. The encoder provides a rotation angle of a rotor of the AC servomotor so as to provide a switching current to a stator of the AC servomotor, thereby generating a corresponding electromagnetic field. When the AC servomotor is installed on the applied mechanism, the requirements of location positioning, speed control, and/or counting of the turn number of the motor could be achieved. When the system power (i.e., the utility power) coupled to the motor is failed or abnormally interrupted, the encoder stops counting the turn number of the AC servomotor. Then, when the system power is recovered, the encoder recounts the turn number of the AC servomotor. Therefore, the purpose of the present invention is to let the encoder to be able to count the turn number of the AC servomotor even when the system power could not supply power normally, and thus when the system power is recovered, the encoder is not required to restart operation (e.g., re-count the turn number of the AC servomotor), such that the encoder could meet the requirement of the market.

The present invention relates to an absolute encoder, but the present invention is not limited thereto. The absolute encoder could be a single-turn absolute encoder or a multi-turn absolute encoder. Types of the multi-turn absolute encoder include a mechanical gear type, an external battery type, and a Wiegand rotary type according to the function for counting the turn number. The mechanical gear type absolute encoder requires a larger space for containing the gear structure when a capacity of turn number counting is larger, and thus the mechanical gear type absolute encoder could not be designed to be thinner. The mechanical gear type absolute encoder further has a problem of wear reliability. Because the sizes of the motor and the encoder are limited due to the space consideration, the AC servomotor generally adopts the external battery type absolute encoder. However, the external battery type absolute encoder has the installation space issue and the battery life issue. In general, the battery of the external battery type absolute encoder is required to be replaced after one year to three years have passed. In addition, the Wiegand rotary type absolute encoder has higher cost of fabrication. The Wiegand rotary type absolute encoder further generates the corresponding cogging torque. For high-precision speed control, the cogging torque generates the negative transient drag and is not easy to improve.

SUMMARY

The present invention provides a controlling method of an encoder. The encoder includes a switching unit and a battery, and the encoder is coupled to a driving circuit of a motor. The driving circuit is configured to provide an operating voltage to the encoder such that the encoder performs the controlling method. The controlling method includes: detecting a rotation angle of a rotor of the motor to generate a first counting trigger signal and a second counting trigger signal so as to perform a turn number counting procedure; determining whether a first period that the operating voltage is smaller than a threshold voltage exceeds a first preset time; and controlling the switching unit to allow the battery to provide a backup voltage to the encoder when the first period exceeds the first preset time, in which the encoder performs a low power processing procedure when the battery provides the backup voltage to the encoder. The low power processing procedure includes: performing the turn number counting procedure according to the first counting trigger signal and the second counting trigger signal; determining whether the first period remains to exceed the first preset time; and determining whether a second period that the first counting trigger signal and the second counting trigger signal are idle exceeds a second preset time when the first period remains to exceed the first preset time. When the second period exceeds the second preset time, the encoder stores the first counting trigger signal and the second counting trigger signal and performs a sleep processing procedure.

In accordance with one or more embodiments of the invention, the low power processing procedure further includes: when the second period does not exceed the second preset time, performing the turn number counting procedure according to the first counting trigger signal and the second counting trigger signal, and then determining whether the first period remains to exceed the first preset time.

In accordance with one or more embodiments of the invention, the controlling method further includes: determining whether the first period remains to exceed the first preset time when the sleep processing procedure is performed; and controlling the switching unit to allow the driving circuit to provide the operating voltage to the encoder when the sleep processing procedure is performed and the first period does not remain to exceed the first preset time.

In accordance with one or more embodiments of the invention, when a phase difference between the first counting trigger signal and the second counting trigger signal is 90 degrees, the turn number counting procedure includes: (a) receiving the first counting trigger signal and the second counting trigger signal; (b) increasing a turn number of the motor by one when voltage levels of the first counting trigger signal and the second counting trigger signal are identical to voltage levels of the first counting trigger signal and the second counting trigger signal which are received at a first time; and (c) repeating above steps.

In accordance with one or more embodiments of the invention, the encoder performs the sleep processing procedure to stop performing the turn number counting procedure.

The present invention further provides an encoder. The encoder is coupled to a driving circuit of a motor. The encoder includes a sensor, a controller coupled to the sensor and the driving circuit, a switching unit coupled to the driving circuit and the controller, and a battery coupled to the switching unit. The sensor is coupled to a rotor of the motor so as to sense and output a first counting trigger signal and a second counting trigger signal. The controller receives the first counting trigger signal and the second counting trigger signal outputted from the sensor. The driving circuit provides an operating voltage to the controller. The controller counts a turn number of the motor according to the first counting trigger signal and the second counting trigger signal. The controller determines whether a first period that the operating voltage is smaller than a threshold voltage exceeds a first preset time. When the controller determines that the first period exceeds the first preset time, the controller controls the switching unit to allow the battery to provide a backup voltage to the controller. When the battery provides the backup voltage to the controller, the controller counts the turn number of the motor according to the first counting trigger signal and the second counting trigger signal and determines whether the first period exceeds the first preset time. When the battery provides the backup voltage to the controller and the controller determines that the first period exceeds the first preset time, the controller determines whether a second period that the first counting trigger signal and the second counting trigger signal are idle exceeds a second preset time. When the controller determines that the second period exceeds the second preset time, the controller stores the first counting trigger signal and the second counting trigger signal and performs a sleep processing procedure.

In accordance with one or more embodiments of the invention, the controller performs the sleep processing procedure to stop counting the turn number of the motor.

In accordance with one or more embodiments of the invention, the sensor includes a magnet coupled to the rotor of the motor, a first magnetic element, and a second magnetic element. A rotation angle of the magnet is identical to a rotation angle of the rotor. The first magnetic element is configured to detect the rotation angle of the magnet so as to output the first counting trigger signal. The second magnetic element is configured to detect the rotation angle of the magnet so as to output the second counting trigger signal. The controller receives voltage levels of the first counting trigger signal and the second counting trigger signal. When the voltage levels of the first counting trigger signal and the second counting trigger signal are identical to voltage levels of the first counting trigger signal and the second counting trigger signal which are received at a first time, the turn number of the motor is increased by one.

In accordance with one or more embodiments of the invention, the encoder further includes a wire cover. The wire cover is formed of a plastic material such that the wire cover could block heat conduction. The battery is disposed within the wire cover.

In accordance with one or more embodiments of the invention, the encoder further includes a wiring assembly. The battery is integrated with the wiring assembly.

In accordance with one or more embodiments of the invention, when the controller determines that the second period does not exceed the second preset time, the controller counts the turn number of the motor according to the first counting trigger signal and the second counting trigger signal, and then determines whether the first period remains to exceed the first preset time.

In accordance with one or more embodiments of the invention, when the controller performs the sleep processing procedure, the controller determines whether the first period remains to exceed the first preset time, and the controller controls the switching unit to allow the driving circuit to provide the operating voltage to the controller when the controller determines that the first period does not remain to exceed the first preset time.

In accordance with one or more embodiments of the invention, each of the first magnetic element and the second magnetic element is a hall sensor or a tunneling magnetoresistance (TMR) sensor.

The present invention further provides a motor. The motor includes a rotor, a driving circuit, a sensor, a controller coupled to the sensor and the driving circuit, a switching unit coupled to the driving circuit and the controller, and a battery coupled to the switching unit. The driving circuit is configured to output an operating voltage. The sensor is coupled to the rotor so as to sense and output a first counting trigger signal and a second counting trigger signal. The controller receives the first counting trigger signal and the second counting trigger signal outputted from the sensor. The driving circuit provides an operating voltage to the controller. The controller counts a turn number of the motor according to the first counting trigger signal and the second counting trigger signal. The controller determines whether a first period that the operating voltage is smaller than a threshold voltage exceeds a first preset time. When the controller determines that the first period exceeds the first preset time, the controller controls the switching unit to allow the battery to provide a backup voltage to the controller. When the battery provides the backup voltage to the controller, the controller counts the turn number of the motor according to the first counting trigger signal and the second counting trigger signal and determines whether the first period remains to exceed the first preset time. When the battery provides the backup voltage to the controller and the controller determines that the first period remains to exceed the first preset time, the controller determines whether a second period that the first counting trigger signal and the second counting trigger signal are idle exceeds a second preset time. When the controller determines that the second period exceeds the second preset time, the controller stores the first counting trigger signal and the second counting trigger signal and performs a sleep processing procedure.

In accordance with one or more embodiments of the invention, the controller performs the sleep processing procedure to stop counting the turn number of the motor.

In accordance with one or more embodiments of the invention, the sensor includes a magnet coupled to the rotor of the motor, a first magnetic element, and a second magnetic element. A rotation angle of the magnet is identical to a rotation angle of the rotor. The first magnetic element is configured to detect the rotation angle of the magnet so as to output the first counting trigger signal. The second magnetic element configured to detect the rotation angle of the magnet so as to output the second counting trigger signal. The controller receives voltage levels of the first counting trigger signal and the second counting trigger signal. When the voltage levels of the first counting trigger signal and the second counting trigger signal are identical to voltage levels of the first counting trigger signal and the second counting trigger signal which are received at a first time, the turn number of the motor is increased by one.

In accordance with one or more embodiments of the invention, the motor further includes a back cover. The battery is hidden within the back cover.

In accordance with one or more embodiments of the invention, when the controller determines that the second period does not exceed the second preset time, the controller counts the turn number of the motor according to the first counting trigger signal and the second counting trigger signal, and then determines whether the first period remains to exceed the first preset time.

In accordance with one or more embodiments of the invention, when the controller performs the sleep processing procedure, the controller determines whether the first period remains to exceed the first preset time, and the controller controls the switching unit to allow the driving circuit to provide the operating voltage to the controller when the controller determines that the first period does not remain to exceed the first preset time.

In accordance with one or more embodiments of the invention, each of the first magnetic element and the second magnetic element is a hall sensor or a tunneling magnetoresistance (TMR) sensor.

In order to let above mention of the present invention and other objects, features, advantages, and embodiments of the present invention to be more easily understood, the description of the accompanying drawing as follows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation. The using of "first", "second", "third", etc. in the specification should be understood for identify units or data described by the same terminology, but are not referred to particular order or sequence.

Figure 1:
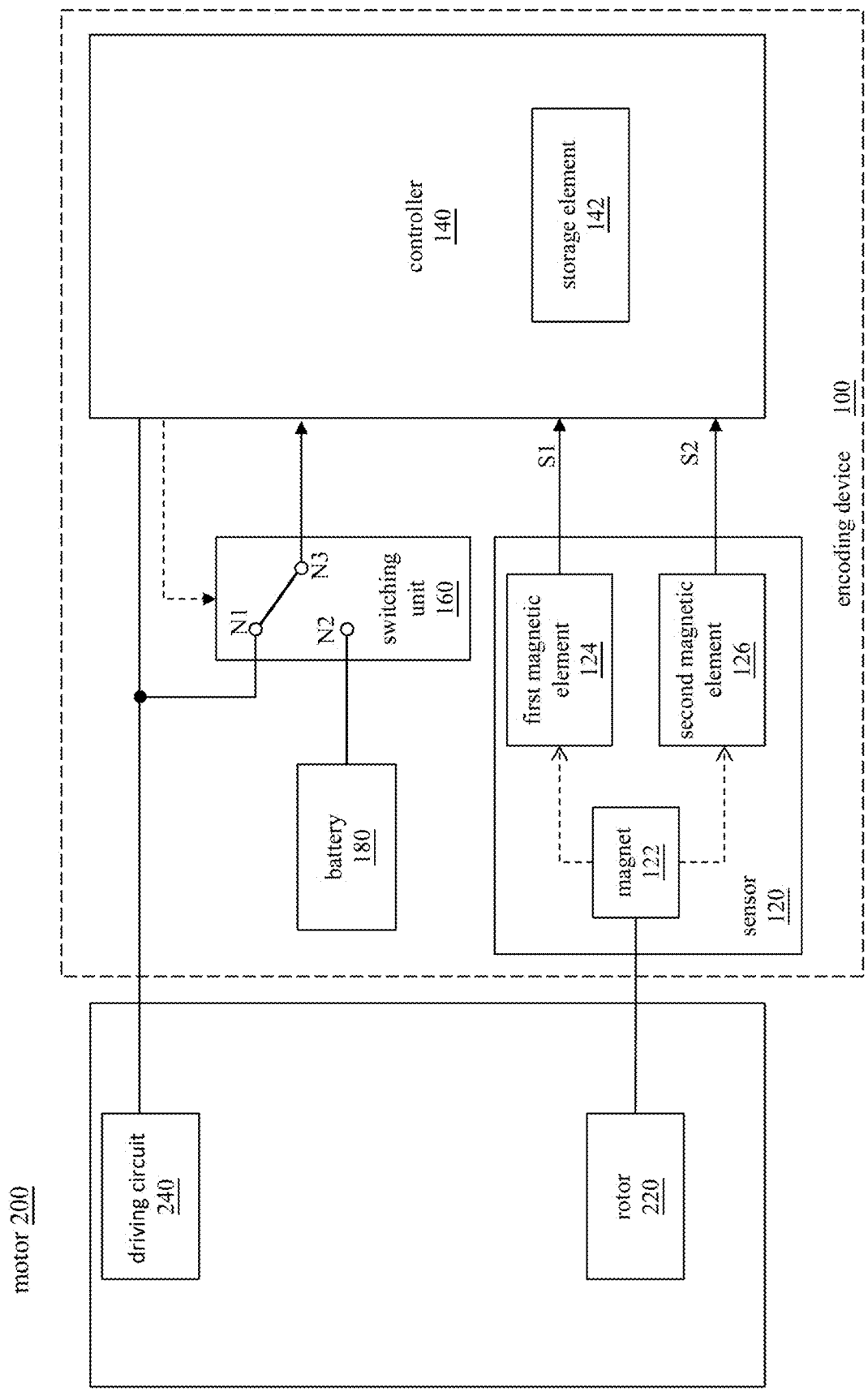
FIG. 1 illustrates a block diagram of a motor according to some embodiments of the present invention.

FIG. 1 illustrates a block diagram of a motor 200 according to some embodiments of the present invention. As shown in FIG. 1, the motor 200 includes a rotor 220, a driving circuit 240, and an encoder 100. The encoder 100 is coupled to the rotor 220 and driving circuit 240. The encoder 100 is configured to count a turn number of the motor 200. The encoder 100 includes a sensor 120, a controller 140, a switching unit 160, and a battery 180. The controller 140 is coupled to the sensor 120, the switching unit 160, and the driving circuit 240. The sensor 120 is coupled to the rotor 220.

The sensor 120 of the encoder 100 includes a magnet 122, a first magnetic element 124, and a second magnetic element 126. The magnet 122 is coupled to the rotor 220 of the motor 200, such that a rotation angle of the magnet 122 is identical to a rotation angle of the rotor 220 of the motor 200. The first magnetic element 124 detects the rotation angle of the magnet 122 so as to output a first counting trigger signal S1. The second magnetic element 126 detects the rotation angle of the magnet 122 so as to output a second counting trigger signal S2. In some embodiments of the present invention, each of the first magnetic element 124 and the second magnetic element 126 may be a hall sensor or a tunneling magnetoresistance (TMR) sensor, but the present invention is not limit thereto.

Figure 2:
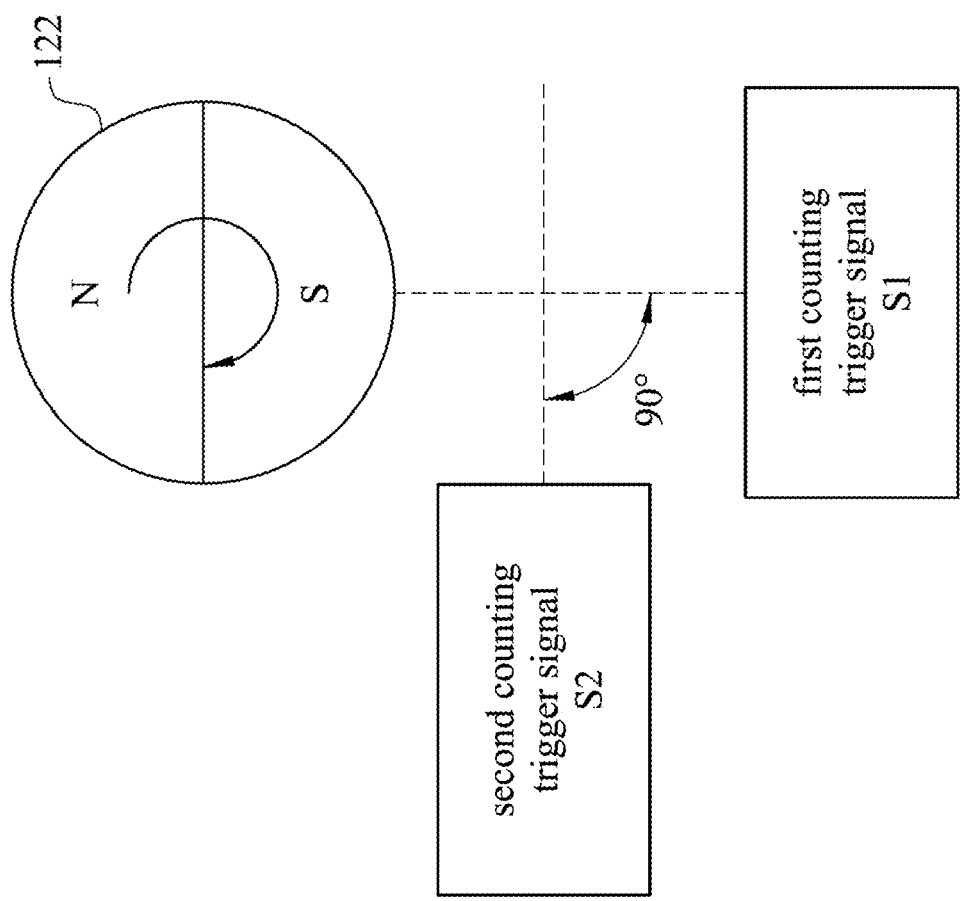
FIG. 2 illustrates a diagram for showing a phase difference between a first counting trigger signal and a second counting trigger signal according to some embodiments of the present invention.

As shown in FIG. 2, a half part of the magnet 122 is the north pole (N pole), and the other half part of the magnet 122 is the south pole (S pole). The first magnetic element 124 and the second magnetic element 126 are configured to sense the magnetic pole which is alternative changed between N pole and S pole when the magnet 122 rotates. Then, the first magnetic element 124 and the second magnetic element 126 respectively output the corresponding first counting trigger signal S1 and the corresponding second counting trigger signal S2 according to the sensed N pole and/or the sensed S pole. When the magnet 122 rotates one turn (360 degrees), a phase difference between the first counting trigger signal S1 and the second counting trigger signal S2 is 90 degrees. In addition, when the first magnetic element 124 senses the N pole of the magnet 122, the first magnetic element 124 output a high voltage level signal. However, when the first magnetic element 124 senses the S pole of the magnet 122, the first magnetic element 124 output a low voltage level signal. The operation of the second magnetic element 126 is the same as the operation of the first magnetic element 124, and therefore the operation of the second magnetic element 126 is not repeated here to avoid duplicity.

As shown in FIG. 1, the driving circuit 240 of the motor 200 is coupled to a first input node N1 of the switching unit 160. The battery 180 is coupled to a second input node N2 of the switching unit 160. The output node N3 of the switching unit 160 is coupled to a power supplying terminal of the controller 140. Under a normal situation, the first input node N1 of the switching unit 160 is connected to the output node N3, such that the driving circuit 240 of the motor 200 provides an operating voltage to the controller 140 of the encoder 100.

As shown in FIG. 1, the controller 140 of the encoder 100 is coupled to the first magnetic element 124 and the second magnetic element 126 to respectively receive the first counting trigger signal S1 and the second counting trigger signal S2. The controller 140 of the encoder 100 is configured to perform a turn number counting procedure according to the first counting trigger signal S1 and the second counting trigger signal S2, thereby counting the turn number of the rotor 220 of the motor 200.

Figure 3A:
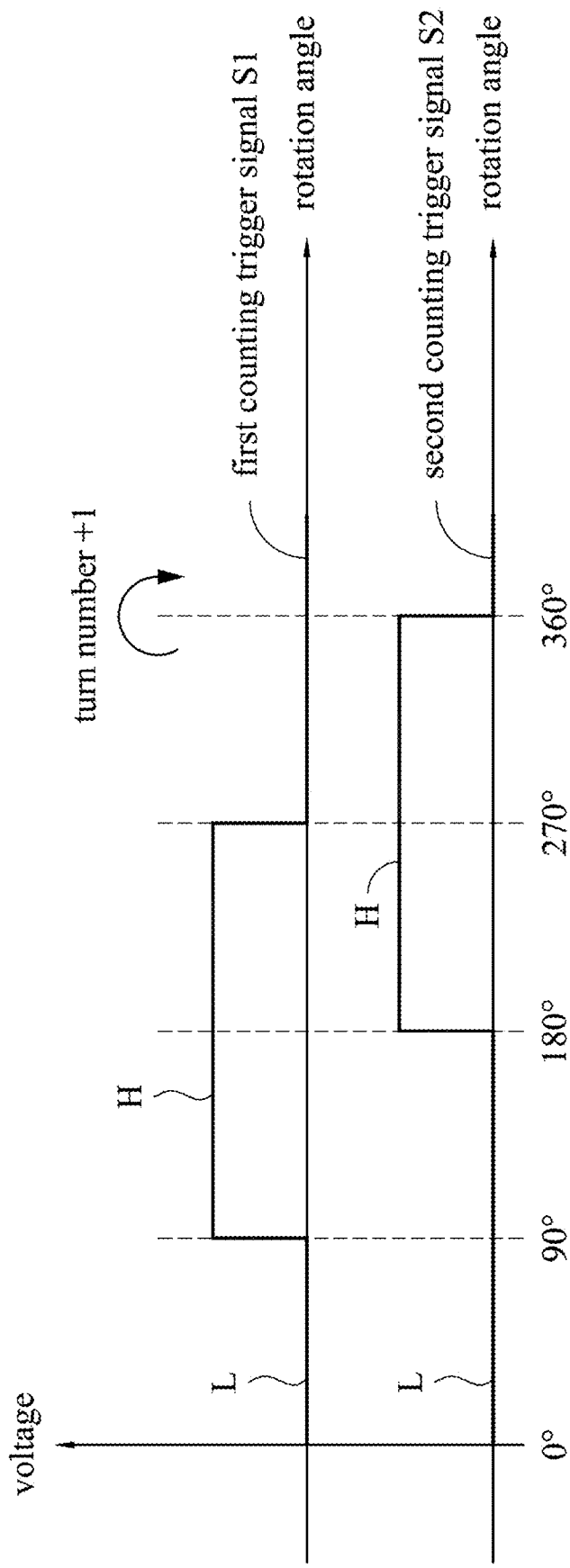
FIG. 3a illustrates a diagram for explaining that a turn number counting procedure is performed based on the first counting trigger signal and the second counting trigger signal according to some embodiments of the present invention.
Figure 3B:
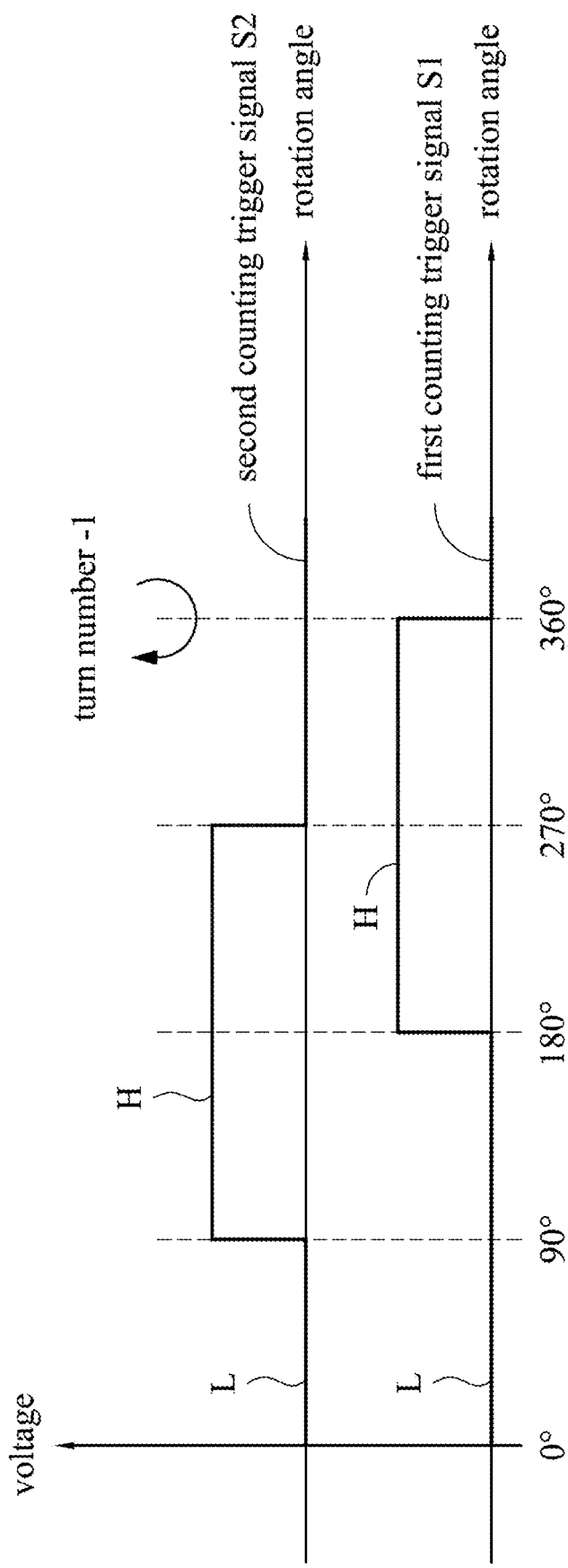
FIG. 3b illustrates a diagram for explaining that a turn number counting procedure is performed based on the first counting trigger signal and the second counting trigger signal according to some embodiments of the present invention.

FIGS. 3a and 3b illustrate diagrams for explaining that the turn number counting procedure is performed based on the first counting trigger signal and the second counting trigger signal according to some embodiments of the present invention. As shown in FIG. 2 and FIGS. 3a and 3b, in some embodiments of the present invention, the controller 140 determines whether the phase difference between the first counting trigger signal S1 and the second counting trigger signal S2 is positive 90 degrees (leading phase) (e.g., FIG. 3a) or negative 90 degrees (lagging phase) (e.g., FIG. 3b). When the controller 140 determines that the phase difference is positive 90 degrees, it represents that the rotor 220 of the motor 200 rotates forwards. When the controller 140 determines that the phase difference is negative 90 degrees, it represents that the rotor 220 of the motor 200 rotates backwards. When the controller 140 determines that the rotor 220 of the motor 200 rotates forwards, because the phase difference between the first counting trigger signal S1 and the second counting trigger signal S2 is 90 degrees, as shown in FIG. 3a, the voltage levels of the first counting trigger signal S1 that the rotation angle of the rotor 220 is within the range of 0-90, 90-180, 180-270, and 270-360 degrees are LHHL (0110), and the voltage levels of the second counting trigger signal S2 that the rotation angle of the rotor 220 is within the range of 0-90, 90-180, 180-270, and 270-360 degrees are LLHH (0011). L(0) represents the low voltage level, and H(1) represents the high voltage level, and the voltage of the high voltage level H(1) is higher than the voltage of the low voltage level L(0). As shown in FIG. 3a, when the voltage level of the first counting trigger signal S1 is detected to be L(0) again and the voltage level of the second counting trigger signal S2 is detected to be L(0) again, it represents that the rotor 220 of the motor 200 rotates forwards by one turn, and therefore the controller 140 increases the turn number of the motor 200 by one.

When the controller 140 determines that the rotor 220 of the motor 200 rotates backwards, because the phase difference between the first counting trigger signal S1 and the second counting trigger signal S2 is 90 degrees, as shown in FIG. 3b, the voltage levels of the first counting trigger signal S1 that the rotation angle of the rotor 220 is within the range of 0-90, 90-180, 180-270, and 270-360 degrees are LLHH (0011), and the voltage levels of the second counting trigger signal S2 that the rotation angle of the rotor 220 is within the range of 0-90, 90-180, 180-270, and 270-360 degrees are LHHL (0110). As shown in FIG. 3b, when the voltage level of the first counting trigger signal S1 is detected to be L(0) again and the voltage level of the second counting trigger signal S2 is detected to be L(0) again, it represents that the rotor 220 of the motor 200 rotates backwards by one turn, and therefore the controller 140 decrements the turn number of the motor 200 by one. As described above, the controller 140 of the encoder 100 could perform the turn number counting procedure to count the turn number of the rotor 220 of the motor 200 according to the voltage level changes of the first counting trigger signal S1 and the second counting trigger signal S2.

As shown in FIG. 1, the controller 140 includes a storage element 142. The storage element 142 is configured to store the result of counting of the turn number of the motor 200. That is, the controller 140 records the result of counting of the turn number of the motor 200 and stores the result of counting of the turn number of the motor 200 in the storage element 142. In some embodiments of the present invention, the controller 140 could be realized by the processor, and the storage element 142 could be realized by the memory. The processor is central processing unit (CPU), microcontroller unit (MCU), or field programmable gate array (FPGA), etc.

As shown in FIG. 1, the controller 140 of the encoder 100 receives the operating voltage provided from the driving circuit 240 of the motor 200, such that the controller 140 of the encoder 100 performs the turn number counting procedure. In other words, under the normal situation, the driving circuit 240 of the motor 200 provides the operating voltage to the controller 140 of the encoder 100, such that the controller 140 of the encoder 100 performs the turn number counting procedure so as to obtain the turn number of the rotor 220 of the motor 200.

In some embodiments of the present invention, when the driving circuit 240 of the motor 200 could not normally provides the operating voltage to the controller 140 of the encoder 100, the battery 180 of the encoder 100 provides a backup voltage to the controller 140 of the encoder 100, such that the controller 140 of the encoder 100 still could normally perform the turn number counting procedure so as to obtain the turn number of the rotor 220 of the motor 200.

Figure 4:
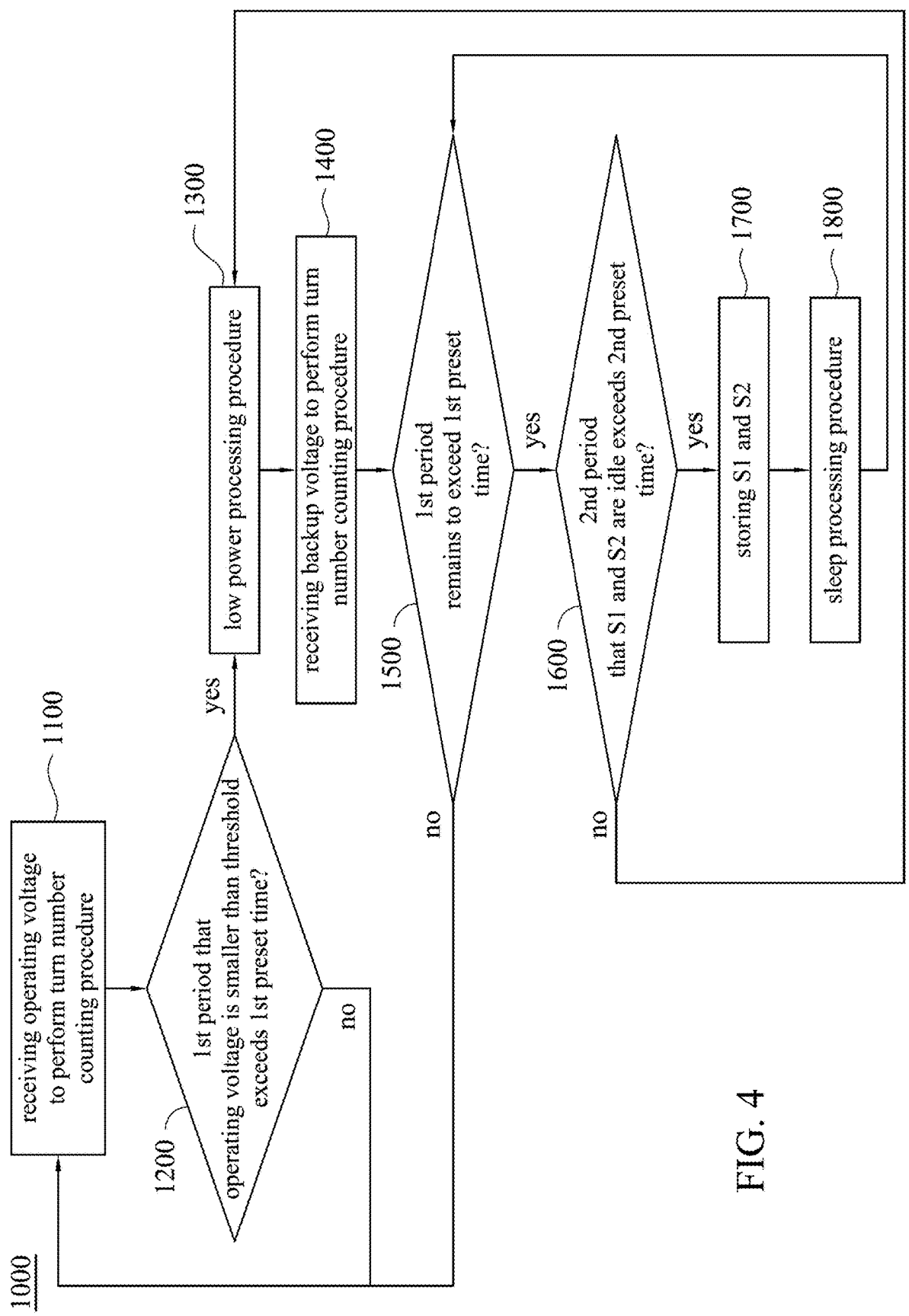
FIG. 4 illustrates a flow chart of a controlling method of an encoder according to some embodiments of the present invention.

FIG. 4 illustrates a flow chart of a controlling method 1000 of the encoder 100 according to some embodiments of the present invention. The controlling method 1000 includes plural steps 1100-1800. As shown in FIGS. 1 and 4, in step 1100, the controller 140 of the encoder 100 receives the operating voltage provided from the driving circuit 240 of the motor 200, such that the controller 140 of the encoder 100 performs the turn number counting procedure according to the first counting trigger signal S1 and the second counting trigger signal S2.

When a phase difference between the first counting trigger signal S1 and the second counting trigger signal S2 is 90 degrees, the turn number counting procedure includes steps (a)-(c). In step (a), the first counting trigger signal S1 and the second counting trigger signal S2 are received. In step (b), the turn number of the rotor 220 of the motor 200 is increased by one when voltage levels of the first counting trigger signal S1 and the second counting trigger signal S2 are identical to voltage levels of the first counting trigger signal S1 and the second counting trigger signal S2 which are received at the first time. For example, as shown in FIG. 3a, voltage levels of the first counting trigger signal S1 received at the first time when the rotation angle of the rotor 220 is within the range of 0-90, 90-180, 180-270, and 270-360 degrees are LHHL (0110), and voltage levels of the second counting trigger signal S2 received at the first time when the rotation angle of the rotor 220 is within the range of 0-90, 90-180, 180-270, and 270-360 degrees are LLHH (0011). Accordingly, when the voltage level of the first counting trigger signal S1 is detected to be L(0) again and the voltage level of the second counting trigger signal S2 is detected to be L(0) again, it represents that the rotor 220 of the motor 200 rotates forwards by one turn, and therefore the controller 140 increases the turn number of the motor 200 by one. In step (c), the step (a) and the step (b) are repeated.

In step 1200, the controller 140 of the encoder 100 receives the operating voltage provided from the driving circuit 240 of the motor 200 (for example, the operating voltage is 5 volt (V) under the normal situation), and then the controller 140 of the encoder 100 determines whether a first period that the operating voltage is smaller than a threshold voltage (e.g., 4V) exceeds a first preset time (e.g., 1 millisecond (ms)).

When the controller 140 of the encoder 100 determines that the first period exceeds the first preset time, the controller 140 of the encoder 100 determines that the driving circuit 240 of the motor 200 could not normally provide the operating voltage that the controller 140 of the encoder 100 needs. The first period, the first preset time, and the threshold voltage as mentioned above are set to prevent the controller 140 from misjudging that the driving circuit 240 could not normally provide the operating voltage due to the line noise or the electromagnetic interference. In the aforementioned example, the first preset time is 1 ms and the threshold voltage is 4V, but the present invention is not limited thereto.

In step 1200, when the controller 140 of the encoder 100 determines that the first period does not exceed the first preset time, it returns to step 1100, the controller 140 of the motor 100 continues to receive the operating voltage provided from the driving circuit 240 of the motor 200, such that the controller 140 of the encoder 100 performs the turn number counting procedure according to the first counting trigger signal S1 and the second counting trigger signal S2. In addition, when the operating voltage is larger than the threshold voltage, the controller 140 of the motor 100 also continues to perform the turn number counting procedure.

On the other hand, in step 1200, when the controller 140 of the encoder 100 determines that the first period exceeds the first preset time, the step 1300 is performed. In step 1300, the controller 140 of the encoder 100 determines that the driving circuit 240 of the motor 200 could not normally provides the operating voltage that the controller 140 needs, and thus the controller 140 controls the switching unit 160 to allow the battery 180 to provide the backup voltage to the controller 140. The controller 140 performs the low power processing procedure when the battery 180 provides the backup voltage to the controller 140.

As shown in FIG. 1, when the controller 140 of the encoder 100 determines that the first period exceeds the first preset time in step 1200, the controller 140 controls the switching unit 160 to allow the second input node N2 to be connected to the output node N3 in step 1300, such that the battery 180 provides the backup voltage to the controller 140 to allow the controller 140 to perform the low power processing procedure.

The operating process of the low power processing procedure is described in steps 1400, 1500, and 1600. In step 1400, the controller 140 receives the backup voltage provided from the battery 180, such that the controller 140 continues to perform the turn number counting procedure according to the first counting trigger signal S1 and the second counting trigger signal S2. Therefore, even if the driving circuit 240 of the motor 200 could not normally provide the operating voltage that the controller 140 needs, the motor 100 still could let the battery 180 to provide the backup voltage to the controller 140, such that the controller 140 still could normally provide the turn number counting procedure.

Then, in step 1500, the controller 140 of the encoder 100 determines whether the first period that the operating voltage provided from the driving circuit 240 of the motor 200 is smaller than the threshold voltage remains to exceed the first preset time. When the controller 140 determines that the first period does not remain to exceed the first preset time, it represents that the driving circuit 240 of the motor 200 is recovered and could normally provide the operating voltage. Therefore, the controller 140 controls the switching unit 160 to allow the first input node N1 to be connected to the output node N3, such that the driving circuit 240 of the motor 200 provides the operating voltage to the controller 140. Then, it returns to step 1100, the controller 140 receives the operating voltage provided from the driving circuit 240 of the motor 200, such that the controller 140 performs the turn number counting procedure according to the first counting trigger signal S1 and the second counting trigger signal S2.

On the other hand, in step 1500, when the controller 140 determines that the first period remains to exceed the first preset time, the step 1600 is performed. In step 1600, the controller 140 determines whether a second period that the first counting trigger signal S1 and the second counting trigger signal S2 are idle (i.e., the voltage levels of the first counting trigger signal S1 and the second counting trigger signal S2 remain unchanged) exceeds a second preset time (e.g., 6 second). In the aforementioned example, the second preset time is 6 second, but the present invention is not limited thereto.

In step 1600, when the controller 140 determines that the second period does not exceed the second preset time, it returns to the step 1300, the low power processing procedure continues to be performed (i.e., the steps 1400-1600 are performed).

On the other hand, in step 1600, when the controller 140 determines that the second period exceeds the second preset time, the step 1700 is performed. In step 1700, the controller 140 stores the voltage levels of the first counting trigger signal S1 and the second counting trigger signal S2 through a specific circuit, such as a latch. Then, the step 1800 is performed, such that the controller 140 performs a sleep processing procedure. In some embodiments of the present invention, when the controller 140 determines that the second period exceeds the second preset time, it represents that the rotor 220 of the motor 200 stops rotating for a while, and therefore the controller 140 performs a sleep processing procedure to stop counting the turn number of the motor 200.

In addition, the controller 140 stores the voltage levels of the first counting trigger signal S1 and the second counting trigger signal S2, the stored voltage levels represent the final turn number of the motor in the sleep processing procedure. Therefore, when the motor 200 restarts operating, the controller 140 could continue to count the turn number of the motor 200 instead of recounting the turn number. Moreover, when the operating voltage provided from the driving circuit 240 is recovered, the controller 140 could continue to count the turn number of the motor 200.

When the controller 140 performs the sleep processing procedure, the controller 140 determines whether the first period that the operating voltage provided from the driving circuit 240 of the motor 200 is smaller than the threshold voltage remains to exceed the first preset time (i.e., the operation of the step 1500). When the controller 140 determines that the first period does not remain to exceed the first preset time, it represents that the operating voltage provided from the driving circuit 240 of the motor 200 is recovered, and thus it returns to the step 1100, the controller 140 of the encoder 100 receives the operating voltage from the driving circuit 240 of the motor 200, such that the controller 140 performs the turn number counting procedure according to the first counting trigger signal S1 and the second counting trigger signal S2.

As discussed above, when the controller 140 performs the sleep processing procedure, only the signal detection (i.e., the steps 1500 and 1600) is performed and the counting of the turn number of the motor 200 is stopped, so that the power of the battery 180 could be effectively saved to extend the life of the battery 180. In addition, in some embodiments of the present invention, the processer that realizes the controller 140 is a low-power processor, and the circuit that realizes the encoder 100 is a low-power circuit, and the first magnetic element 124 and the second magnetic element 126 are both low-power magnetic elements used for detecting four-quadrant angular signals (i.e., the first counting trigger signal S1 and the second counting trigger signal S2), and the result of counting of the turn number of the motor 200 is stored in the storage element 142. Therefore, the encoder 100 of the present invention could achieve lower power consumption.

The operating manner of the present invention would not have the transient cogging torque problem of the Wiegand rotary type absolute encoder, in which the said transient cogging torque problem is caused by the magnetic field steering induced electricity. In addition, when the conventional absolute encoder is powered by a battery, in general, the infrared emitting diode (IRED) is triggered at a fixed interval, such that the photo diode (PD) generates data signals with one turn number of absolute addresses at a fixed interval, thereby determining whether the motor rotates forwards or backwards so as to count the turn number. When the system power is recovered, the conventional absolute encoder reads the counted turn number of the motor and also reads the absolute position value on the disc, thereby transmitting position information to the servo drive. However, the conventional manner of triggering the IRED at a fixed interval consumes more power, thereby affecting the life of the battery, and the starting speed is also limited by the frequency that triggers the RED at a fixed interval.

For the encoder 100 of the present invention, when the driving circuit 240 of the motor 200 could not normally provide the operating voltage and the rotor 220 of the motor 200 does not rotate, the controller 140 performs the sleep processing procedure so as to stop counting the turn number of the motor 200, thereby saving the power of the battery 180. On the other hand, when the driving circuit 240 of the motor 200 could not normally provide the operating voltage and the rotor 220 of the motor 200 rotates, the battery 180 provides the backup voltage only when the controller 140 performs the low power processing procedure, and therefore the life of the battery 180 could reach ten years without battery replacement, and meanwhile the encoder 100 still could realize the requirement of counting the turn number of the motor 200 when the driving circuit 240 of the motor 200 could not normally provide the operating voltage.

In addition, the encoder 100 of the present invention needs to complete the assembly test and to complete the packaging before the encoder 100 leaves the factory, so it will take a period of time before the encoder 100 is shipped to the user. During the said period of time, the controller 140 of the encoder 100 still performs the sleep processing procedure to save the power of the battery 180, thereby achieving the requirement of more power saving.

The encoder 100 of the present invention also has a better design for the installation position of the battery 180. Specifically, the mulita-turn absolute encoders matched with the conventional AC servomotor are usually external battery type absolute encoders. However, the external battery type absolute encoder has the problem of the installation space. The external battery type absolute encoder installs the battery within the battery box, and the battery box is installed on the encoder line. As a result, for the external battery type absolute encoder, one motor requires one battery box to be externally installed. For example, for the external battery type absolute encoder, the six-axis robotic arm requires six motors with six external battery boxes. Therefore, the external battery type absolute encoder has the problem of limited space and is difficult to repair and replace when the battery is failed.

Figure 5C:
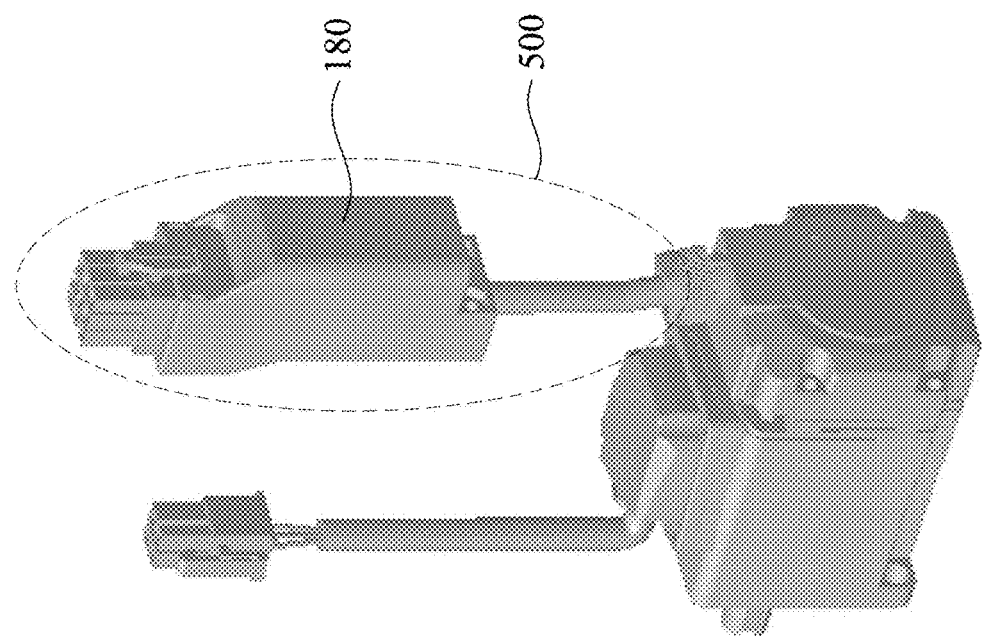
FIGS. 5a-5c illustrate diagram for showing locations that the battery is installed on the motor according to some embodiments of the present invention.
Figure 5A:
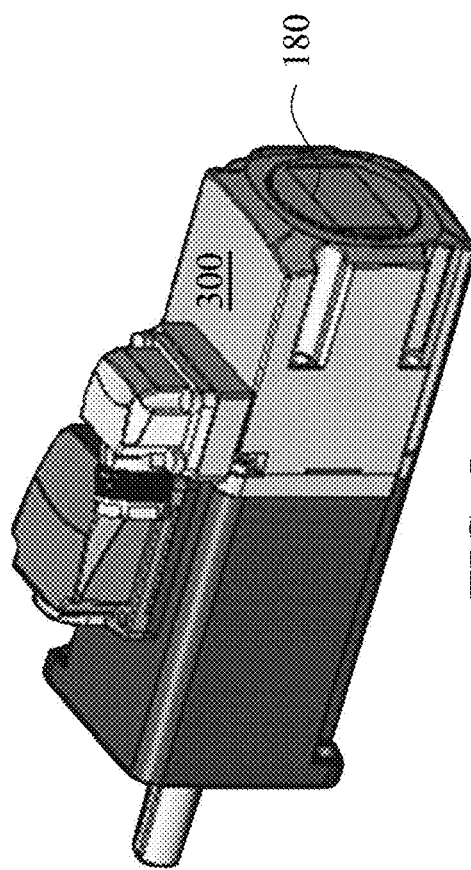
Figure 5B:
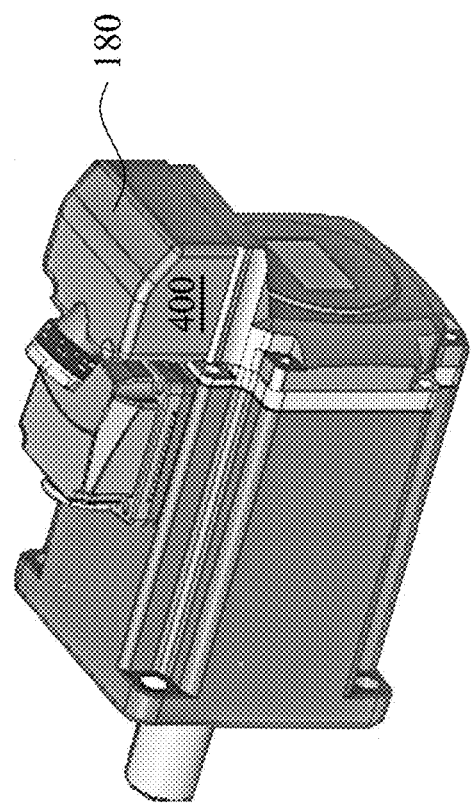

FIGS. 5a-5c illustrate diagrams for showing locations that the battery 180 is installed on the motor 200 according to some embodiments of the present invention. FIG. 5a shows that the battery 180 is hidden within the back cover 300 of the motor 200. If the ambient temperature within the space of the back cover 300 meets the specification of operating temperature of the battery 180, the battery 180 could be hidden within the back cover 300. When the battery 180 has quality problem or is required to be replaced, it just need to replace the back cover 300. The life of servomotor application equipment is usually 5-10 years. It means that if the battery 180 could be designed to realize a life of more than 10 years, the user does not need to replace the battery 180.

FIG. 5b shows that the battery 180 is hidden within the wire cover 400 of the encoder 100. If the ambient temperature within the space of the back cover could not meet the specification of operating temperature of the battery 180, the battery 180 could be hidden within the wire cover 400 of the encoder 100. When the battery 180 has quality problem or is required to be replaced, it just need to replace the wire cover 400. The wire cover 400 is formed of a plastic material such that the wire cover 400 could block heat conduction. The battery 180 is disposed within the wire cover 400. When the controller 140 receives the operating voltage provided from the driving circuit 240 of the motor 200 so as to allow the controller 140 to perform the turn number counting procedure, the battery 180 does not provide the backup voltage, so the heat generation of the battery 180 is very low, and thus it only needs the plastic material to block heat conduction. When the driving circuit 240 of the motor 200 could not normally provide the operating voltage, the battery 180 provides the backup voltage so as to allow the controller to perform the turn number counting procedure, and the circuit of the encoder 100 is a low-power circuit, and therefore the encoder 100 has low current and low heat consumption.

FIG. 5c shows that the battery 180 is integrated with the wiring assembly 500 (including wires and connector terminals) which is connected to the encoder 100. When the battery 180 has quality problem or is required to be replaced, it just need to replace the wiring assembly 500.

From the above description, the present invention provides the encoder 100, the motor 200, and the controlling method 1000 of the encoder 100. The encoder 100 of the present invention does not need to use an external battery box like the conventional external battery type absolute encoder, and thus the encoder 100 of the present invention does not have the problem of limited installation space. Furthermore, the encoder 100 of the present invention adopts the low-power circuits and the low-power components, and the encoder 100 of the present invention counts the turn number of the motor 200 based on the state of the system power and the rotating state of the rotor 220 of the motor 200, so that the life of the battery 180 could reach more than 10 years. Therefore, the present invention does not need to replace the battery 180 in a short period of time (e.g., 1-3 years). In addition, the encoder 100 of the present invention obtains the rotating state of the rotor 220 of the motor 200 through two magnetic elements 124 and 126, and thus the encoder 100 of the present invention would not have the transient cogging torque problem of the Wiegand rotary type absolute encoder, in which the said transient cogging torque problem is caused by the magnetic field steering induced electricity.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A controlling method of an encoder, wherein the encoder includes a switching unit and a battery, wherein the encoder is coupled to a driving circuit of a motor, wherein the driving circuit is configured to provide an operating voltage to the encoder such that the encoder performs the controlling method, wherein the controlling method comprises:

detecting a rotation angle of a rotor of the motor to generate a first counting trigger signal and a second counting trigger signal so as to perform a turn number counting procedure;

determining whether a first period that the operating voltage is smaller than a threshold voltage exceeds a first preset time; and controlling the switching unit to allow the battery to provide a backup voltage to the encoder when the first period exceeds the first preset time, wherein the encoder performs a low power processing procedure when the battery provides the backup voltage to the encoder;

wherein the low power processing procedure comprises:

performing the turn number counting procedure according to the first counting trigger signal and the second counting trigger signal;

determining whether the first period remains to exceed the first preset time; and determining whether a second period that the first counting trigger signal and the second counting trigger signal are idle exceeds a second preset time when the first period remains to exceed the first preset time;

wherein when the second period exceeds the second preset time, the encoder stores the first counting trigger signal and the second counting trigger signal and performs a sleep processing procedure.

2. The controlling method of claim 1, wherein the low power processing procedure further comprises:

when the second period does not exceed the second preset time, performing the turn number counting procedure according to the first counting trigger signal and the second counting trigger signal, and then determining whether the first period remains to exceed the first preset time.

3. The controlling method of claim 2, further comprising:

determining whether the first period remains to exceed the first preset time when the sleep processing procedure is performed; and controlling the switching unit to allow the driving circuit to provide the operating voltage to the encoder when the sleep processing procedure is performed and the first period does not remain to exceed the first preset time.

4. The controlling method of claim 3, wherein when a phase difference between the first counting trigger signal and the second counting trigger signal is 90 degrees, the turn number counting procedure comprises:

(a) receiving the first counting trigger signal and the second counting trigger signal;

(b) increasing a turn number of the motor by one when voltage levels of the first counting trigger signal and the second counting trigger signal are identical to voltage levels of the first counting trigger signal and the second counting trigger signal which are received at a first time; and (c) repeating above steps.

5. The controlling method of claim 4, wherein the encoder performs the sleep processing procedure to stop performing the turn number counting procedure.

6. An encoder, wherein the encoder is coupled to a driving circuit of a motor, wherein the encoder comprises:

a sensor coupled to a rotor of the motor so as to sense and output a first counting trigger signal and a second counting trigger signal;

a controller coupled to the sensor and the driving circuit, wherein the controller receives the first counting trigger signal and the second counting trigger signal outputted from the sensor, wherein the driving circuit provides an operating voltage to the controller, wherein the controller counts a turn number of the motor according to the first counting trigger signal and the second counting trigger signal, wherein the controller determines whether a first period that the operating voltage is smaller than a threshold voltage exceeds a first preset time;

a switching unit coupled to the driving circuit and the controller; and a battery coupled to the switching unit;

wherein when the controller determines that the first period exceeds the first preset time, the controller controls the switching unit to allow the battery to provide a backup voltage to the controller;

wherein when the battery provides the backup voltage to the controller, the controller counts the turn number of the motor according to the first counting trigger signal and the second counting trigger signal and determines whether the first period remains to exceed the first preset time;

wherein when the battery provides the backup voltage to the controller and the controller determines that the first period exceeds the first preset time, the controller determines whether a second period that the first counting trigger signal and the second counting trigger signal are idle exceeds a second preset time;

wherein when the controller determines that the second period exceeds the second preset time, the controller stores the first counting trigger signal and the second counting trigger signal and performs a sleep processing procedure.

7. The encoder of claim 6, wherein the controller performs the sleep processing procedure to stop counting the turn number of the motor.

8. The encoder of claim 6, wherein the sensor comprises:

a magnet coupled to the rotor of the motor, wherein a rotation angle of the magnet is identical to a rotation angle of the rotor;

a first magnetic element configured to detect the rotation angle of the magnet so as to output the first counting trigger signal; and a second magnetic element configured to detect the rotation angle of the magnet so as to output the second counting trigger signal;

wherein the controller receives voltage levels of the first counting trigger signal and the second counting trigger signal;

wherein when the voltage levels of the first counting trigger signal and the second counting trigger signal are identical to voltage levels of the first counting trigger signal and the second counting trigger signal which are received at a first time, the turn number of the motor is increased by one.

9. The encoder of claim 6, further comprising:
a wire cover, wherein the wire cover is formed of a plastic material such that the wire cover could block heat conduction, wherein the battery is disposed within the wire cover.

10. The encoder of claim 6, further comprising:
a wiring assembly, wherein the battery is integrated with the wiring assembly.

11. The encoder of claim 6, wherein when the controller determines that the second period does not exceed the second preset time, the controller counts the turn number of the motor according to the first counting trigger signal and the second counting trigger signal, and then determines whether the first period remains to exceed the first preset time.

12. The encoder of claim 11, wherein when the controller performs the sleep processing procedure, the controller determines whether the first period remains to exceed the first preset time, and the controller controls the switching unit to allow the driving circuit to provide the operating voltage to the controller when the controller determines that the first period does not remain to exceed the first preset time.

13. The encoder of claim 8, wherein each of the first magnetic element and the second magnetic element is a hall sensor or a tunneling magnetoresistance (TMR) sensor.

14. A motor, comprising:
a rotor;
a driving circuit configured to output an operating voltage;
a sensor coupled to the rotor so as to sense and output a first counting trigger signal and a second counting trigger signal;
a controller coupled to the sensor and the driving circuit, wherein the controller receives the first counting trigger signal and the second counting trigger signal outputted from the sensor, wherein the driving circuit provides an operating voltage to the controller, wherein the controller counts a turn number of the motor according to the first counting trigger signal and the second counting trigger signal, wherein the controller determines whether a first period that the operating voltage is smaller than a threshold voltage exceeds a first preset time;
a switching unit coupled to the driving circuit and the controller; and
a battery coupled to the switching unit;
wherein when the controller determines that the first period exceeds the first preset time, the controller controls the switching unit to allow the battery to provide a backup voltage to the controller;
wherein when the battery provides the backup voltage to the controller, the controller counts the turn number of the motor according to the first counting trigger signal and the second counting trigger signal and determines whether the first period remains to exceed the first preset time;
wherein when the battery provides the backup voltage to the controller and the controller determines that the first period remains to exceed the first preset time, the controller determines whether a second period that the first counting trigger signal and the second counting trigger signal are idle exceeds a second preset time;
wherein when the controller determines that the second period exceeds the second preset time, the controller stores the first counting trigger signal and the second counting trigger signal and performs a sleep processing procedure.

15. The motor of claim 14, wherein the controller performs the sleep processing procedure to stop counting the turn number of the motor.

16. The motor of claim 14, wherein the sensor comprises:
a magnet coupled to the rotor of the motor, wherein a rotation angle of the magnet is identical to a rotation angle of the rotor;
a first magnetic element configured to detect the rotation angle of the magnet so as to output the first counting trigger signal; and
a second magnetic element configured to detect the rotation angle of the magnet so as to output the second counting trigger signal;
wherein the controller receives voltage levels of the first counting trigger signal and the second counting trigger signal;
wherein when the voltage levels of the first counting trigger signal and the second counting trigger signal are identical to voltage levels of the first counting trigger signal and the second counting trigger signal which are received at a first time, the turn number of the motor is increased by one.

17. The motor of claim 14, further comprising:
a back cover, wherein the battery is hidden within the back cover.

18. The motor of claim 14, wherein when the controller determines that the second period does not exceed the second preset time, the controller counts the turn number of the motor according to the first counting trigger signal and the second counting trigger signal, and then determines whether the first period remains to exceed the first preset time.

19. The motor of claim 18, wherein when the controller performs the sleep processing procedure, the controller determines whether the first period remains to exceed the first preset time, and the controller controls the switching unit to allow the driving circuit to provide the operating voltage to the controller when the controller determines that the first period does not remain to exceed the first preset time.

20. The motor of claim 16, wherein each of the first magnetic element and the second magnetic element is a hall sensor or a tunneling magnetoresistance (TMR) sensor.

* * * * *